US009200590B2

(12) United States Patent
Griffiths

(10) Patent No.: US 9,200,590 B2
(45) Date of Patent: Dec. 1, 2015

(54) ASSEMBLY WITH COMPOSITE FASTENER FOR ATTACHING COMPONENTS WITH SEALANT AND METHOD OF ATTACHING SAME

(75) Inventor: Leonard Barry Griffiths, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 941 days.

(21) Appl. No.: 13/411,980

(22) Filed: Mar. 5, 2012

(65) Prior Publication Data

US 2013/0228979 A1    Sep. 5, 2013

(51) Int. Cl.
| B25G 3/34 | (2006.01) |
| F16B 11/00 | (2006.01) |
| F16B 12/04 | (2006.01) |
| F16L 13/00 | (2006.01) |
| F02F 7/00 | (2006.01) |
| F02F 11/00 | (2006.01) |
| F16B 5/02 | (2006.01) |
| F16B 37/14 | (2006.01) |

(52) U.S. Cl.
CPC . *F02F 7/00* (2013.01); *F02F 11/00* (2013.01); *F16B 5/02* (2013.01); *F16B 37/145* (2013.01); *Y10T 29/49963* (2015.01); *Y10T 403/472* (2015.01); *Y10T 403/75* (2015.01)

(58) Field of Classification Search
CPC ... Y10T 403/472; Y10T 403/75; F02F 11/00; F16B 37/145; F16B 5/02
USPC ......... 403/179, 185, 194, 199, 200, 267, 291, 403/408.1, 409.1; 411/338, 901–903; 277/316, 605, 650
See application file for complete search history.

(56) References Cited

U.S. PATENT DOCUMENTS

| 375,350 | A |  | 12/1887 | Glover |  |
| 1,475,827 | A |  | 11/1923 | Hogarty |  |
| 2,299,493 | A | * | 10/1942 | Purinton | 24/114.4 |
| 2,590,175 | A |  | 3/1952 | Hajdu |  |
| 4,033,243 | A |  | 7/1977 | Kirrish et al. |  |
| 4,193,434 | A | * | 3/1980 | Wagner | 411/154 |
| 4,238,165 | A | * | 12/1980 | Wagner | 403/408.1 |
| 4,435,112 | A | * | 3/1984 | Becker | 411/368 |
| 4,490,083 | A | * | 12/1984 | Rebish | 411/338 |
| 4,826,378 | A | * | 5/1989 | Pamer et al. | 411/338 |
| 5,048,898 | A | * | 9/1991 | Russell | 301/37.375 |
| 5,062,328 | A | * | 11/1991 | Demurger | 81/186 |
| 5,098,765 | A | * | 3/1992 | Bien | 428/134 |
| 5,852,854 | A |  | 12/1998 | Pierrot et al. |  |
| 6,394,537 | B1 | * | 5/2002 | DeRees | 296/191 |
| 7,891,151 | B2 | * | 2/2011 | Sano | 52/506.05 |
| 7,988,395 | B2 | * | 8/2011 | Steffier | 411/385 |
| 8,109,706 | B2 | * | 2/2012 | Richards | 411/378 |
| 2009/0229429 | A1 | * | 9/2009 | Heesch | 81/461 |

* cited by examiner

*Primary Examiner* — Gregory Binda
*Assistant Examiner* — Nahid Amiri
(74) *Attorney, Agent, or Firm* — Quinn Law Group, PLLC

(57) ABSTRACT

An assembly includes a first component and a second component. A sealant is disposed between the first component and the second component. The second component has a recess on a second surface of the second component opposite the first surface of the second component. A composite fastener has a threaded portion and a head portion. The head portion has a retention clip on a side of the head portion that faces the second surface of the second component when the threaded portion is received in aligned openings of the first component and the second component so that the retention clip is received in the recess when the composite fastener is turned. A method of attaching a first component and a composite component is provided.

12 Claims, 2 Drawing Sheets

ASSEMBLY WITH COMPOSITE FASTENER FOR ATTACHING COMPONENTS WITH SEALANT AND METHOD OF ATTACHING SAME

TECHNICAL FIELD

The present teachings generally include a composite fastener for use with components that are attached with sealant and a method of attaching components using the same.

BACKGROUND

Sealant is sometimes used to attach a composite component to a composite or noncomposite component, such as a metallic component. For example, room temperature vulcanizing (RTV) sealant is sometimes used to attach a composite engine component to a metallic engine block. A joint formed with RTV sealant may not be required to withstand as much loading as some metallic fasteners and metallic components. A composite component may also tend to creep under load.

SUMMARY

Fastening systems used with composite materials should be designed to constrain a composite component while minimizing the tendency for the fasteners to act as fulcrum points under loads. An assembly is provided that includes a first component and a second component. In one embodiment, the first component is an engine block and the second component is a composite engine component, such as an oil pan or a front or rear engine cover. A sealant is disposed between the first component and the second component on a first surface of the first component or on a first surface of the second component facing the first surface of the first component. The sealant may be room temperature vulcanizing (RTV) sealant. The second component has a recess on a second surface of the second component that is opposite the first surface of the second component.

The assembly includes a composite fastener that has a threaded portion and a head portion. The head portion has a retention clip on a side of the head portion that faces the second surface of the second component when the threaded portion is received in aligned openings of the first component and the second component. The clip may be an integral tab extending from the head portion or a metallic clip attached to the head portion. The retention clip is received in the recess when the composite fastener is turned. The second component is thereby attached to the first component and compresses the sealant between the first component and the second component. In one embodiment, a metallic member is embedded in the composite fastener to reduce creep of the composite material.

A method of attaching a first component and a composite component includes placing a sealant on one of the first component and the composite component, and turning a one-piece composite fastener into aligned openings of the first component and the composite component until a retention clip of the fastener engages the composite component at a recess of the composite component to thereby attach the composite component to the first component. The first component may be a composite component or a noncomposite component.

The method may also include injection molding the one-piece composite fastener with an elongated metallic member embedded within the one-piece composite fastener. The one-piece fastener could engage in a threaded hole in the first component or in a nut cap in the first component. The nut cap could have prongs that engage in aligned openings or slots in the first component and/or the second component prior to turning the one-piece composite fastener.

Using a composite fastener may present a cost savings in comparison to a traditional metallic bolt and compression cylinder used to attach a composite component to a metallic component or to another composite component. The composite fastener would be more compliant that the traditional metallic bolt, so as not to act as a fulcrum point that magnifies motion. The composite fastener can attach the components during curing of the sealant and provides a mechanical constraint. The retention clip of the fastener can enable simple and quick releasing of the fastener, if desired, after the sealant cures.

The above features and advantages and other features and advantages of the present teachings are readily apparent from the following detailed description of the best modes for carrying out the present teachings when taken in connection with the accompanying drawings.

DETAILED DESCRIPTION

Figure 1:
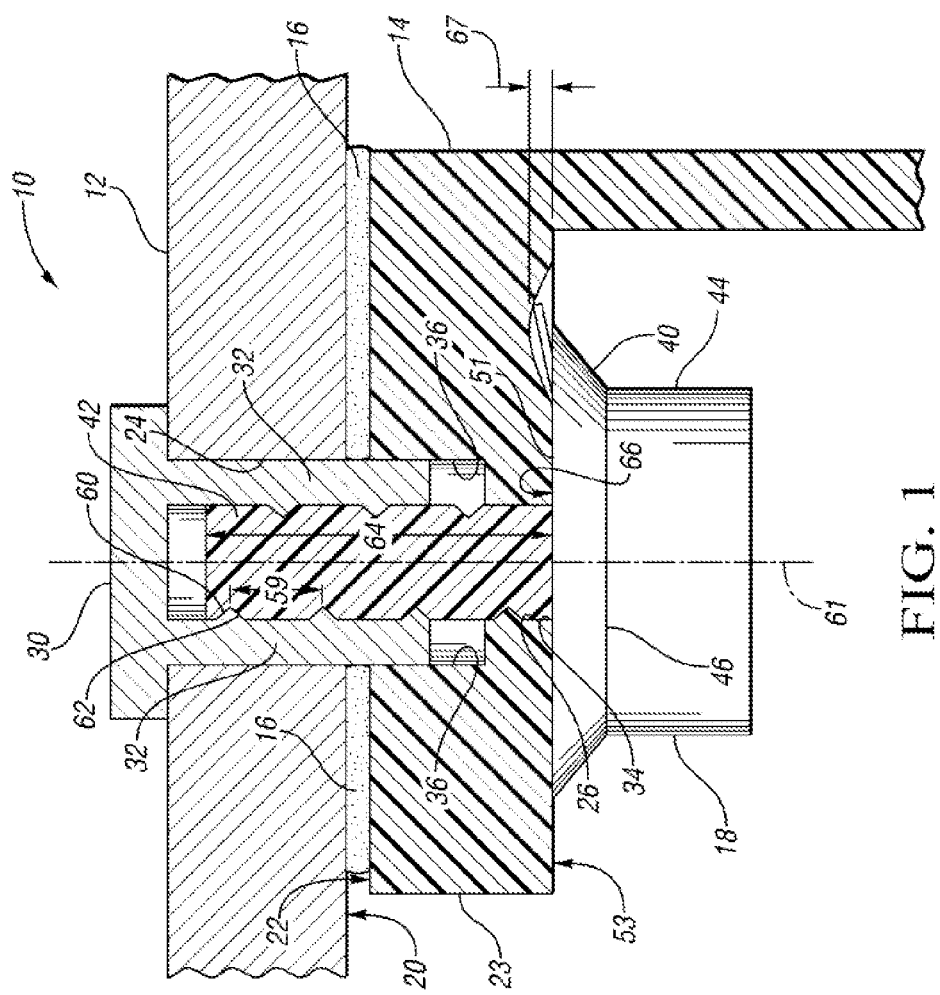
FIG. 1 is a partially cross-sectional and fragmentary schematic illustration of a first embodiment of an assembly including a composite engine component and an engine block attached via a composite fastener with room temperature vulcanizing (RTV) sealant between the engine component and the engine block.

Referring to the drawings, wherein like reference numbers refer to like components throughout the several views, FIG. 1 shows an assembly 10. The assembly 10 includes a first component 12 that is adhered to a composite second component 14 by sealant 16, with a composite fastener 18 used to attach the first component 12 to the second component 14 and thereby compress the sealant 16, such as when the sealant 16 is sealing.

The first component 12 can be a cast, metallic engine block, such as a cast aluminum alloy or a cast steel. Alternatively, the first component 12 can be a composite component. The second component 14 can be a composite engine component such as an oil pan, an engine front cover, an engine side cover, or another component. Within the scope of the claimed invention, the first component 12 and the second component 14 are not limited to these examples. As used herein, "composite" when used to describe a component, such as a fastener or an engine component, is a material that is a composite of a polymer and another material. For example, a "composite"

may be a glass-reinforced nylon, a glass-reinforced Acrylonitrile Butadiene Styrene (ABS), a glass-filled thermoset, a glass-filled Polybutylene Terephthalate (PBT), a glass-filled Polyethylene terephthalate (PET), or other polymer composite.

The sealant 16 can be a room temperature vulcanizing (RTV) sealant that begins to cure when exposed to air in a predetermined temperature range that may be considered to include a normal room temperature range. The sealant 16 is placed on a first surface 20 of the first component 12. The first surface 20 faces a first surface 22 of the second component 14 such as a surface on a flange 23 of the second component 14.

The fastener 18 is used to connect the second component 14 to the first component 12 so that the first surface 22 will also be in contact with the sealant 16 and the sealant 16 will be compressed between the components 12, 14. The fastener 18 is used to attach the second component 14 to the first component 12 immediately after application of the sealant 16 to the first surface 20 of the engine component 12, or within a time period during which the sealant 16 is curing, thereby allowing the sealant 16 to bond and seal the first component 12 to the second component 14.

Figure 5:
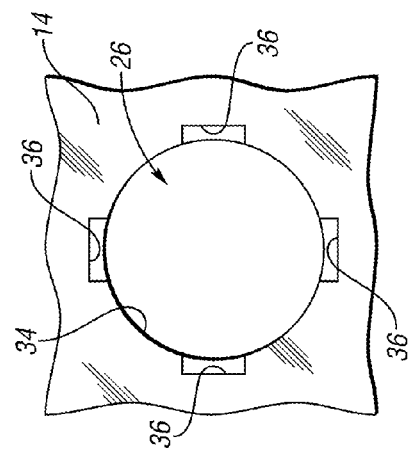
FIG. 5 is a schematic illustration in plan view of an opening in the composite component in which the nut cap is received.

The first component 12 has a first opening 24 that is generally aligned with a second opening 26 in the second component 14. In the embodiment shown, a nut cap 30 is inserted into the first opening 24 so that spaced threaded prongs 32 of the nut cap 30 extend downward into the second opening 26. As illustrated in FIG. 5, the second opening 26 has a center portion 34 and prong-receiving portions 36. The center portion 34 is configured to receive the fastener 18 and the prong-receiving portions 36 are configured to receive the prongs 32 and are spaced in like manner as the prongs 32 so that the nut cap 30 is engaged with the second component 14. In this embodiment, the prong-receiving portions 36 do not extend completely through the second component 14 as shown in FIG. 1. In another embodiment of an assembly 110 shown in FIG. 6, a second opening 126 in the second portion 14 has prong receiving portions 136 that extend completely through the second component 14.

Figure 2:
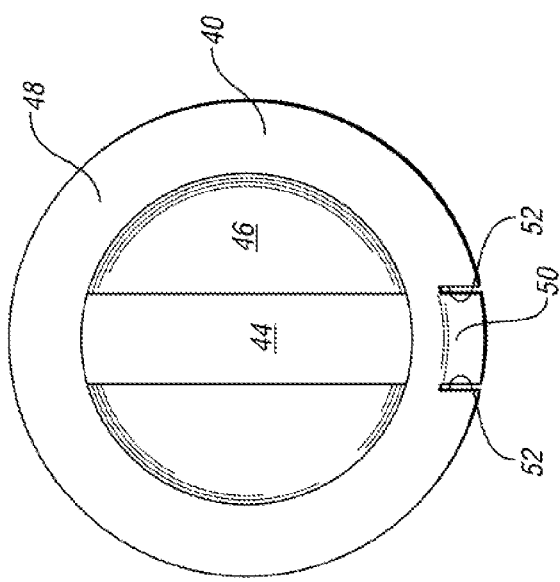
FIG. 2 is a schematic illustration in plan view of a head portion of the fastener viewed from below in FIG. 1.

Referring again to FIG. 1, the fastener 18 has a head portion 40 and an elongated threaded portion 42 extending from the head portion 40. As shown in FIG. 2, a single turn blade 44 extends across a base 46 of the head portion 40. A tapered flange 48 of the head portion 40 extends about a circumference of the base 46. A portion of the flange 48 is interrupted by a retention clip 50 formed between slits 52 in the flange 48. The clip 50 extends toward the threaded portion 42 from the flange 48. The clip 50 is on a side 51 of the head portion 40 that faces a second surface 53 of the second component 14 when the threaded portion 42 is received in the aligned openings 24, 26. The second surface 53 has a recess 58 that is configured to receive the clip 50 as discussed below. The clip 50 can be a unitary portion of the head portion 40, or can be a metallic clip attached to the head portion 40.

The prongs 32 have an internal thread 60 that matches an external thread 62 of the threaded portion 42. The fastener 18 is thus received in the nut cap 30 and secured to the first component 12 via the nut cap 30. In other embodiments, no nut cap is used and instead, the first opening 24 in the first component 12 is sized so that the threaded portion 42 of the fastener 18 fits directly into the first opening 24. In such an embodiment, the first component 12 would be internally threaded at the first opening 24 with a thread that matches the thread of the threaded portion 42.

Figure 3:
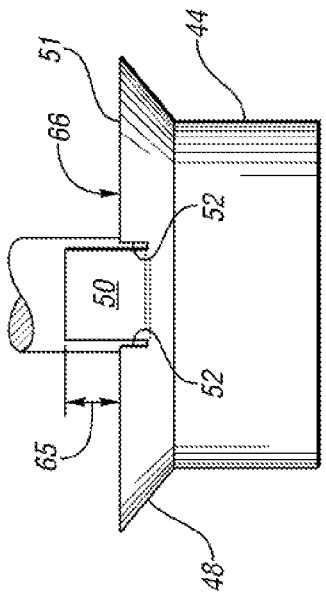
FIG. 3 is a schematic illustration in fragmentary side view of the fastener of FIG. 1.

The pitch 59 of the external thread 62 is the full or partial compression distance along a center axis 61 of the threaded portion 42. That is, the pitch 59 is the full or partial axial distance to compress the sealant at the joint (i.e., at the interface of the components 12, 14. The pitch 59 of the external thread 62 is the same as the pitch of the internal thread 60. In an embodiment with a nut cap 30 or an embodiment without a nut cap 30 and in which the first component 12 is threaded at a first opening sized to receive the threaded portion 42, the pitch 59 of the external thread 62 and of the internal thread 60 is chosen in relation to the length 64 of the threaded portion 42 and the height 65 above the flange 48 of the head portion 40 of the retaining clip 50 in its uncompressed state (shown in FIG. 3). Specifically, the pitch 59 is selected so that the retaining clip 50 does not interfere with the second component 14 at the recess 58 until the sealant 16 at the joint of the components 12, 14 is sufficiently compressed. The pitch 59 of the thread 62 is larger than the height 65 of the retaining clip 50 above the flange 48 in the uncompressed state. The surface 66 of the head portion 40 at the side 51 facing the second surface 53 contacts the second surface 53 when the retaining clip 50 engages the second component 14 at the recess 58. The recess 58 may be gradually sloped about its perimeter, similar to the slope shown in the cross-section of FIG. 1.

The retaining clip 50 is somewhat flexible so that it can be compressed downward toward the head portion 40 when it is engaged against the second component 14 in the recess 58. That is, the height 67 of the clip 50 from the flange 48 when the clip 50 is in a compressed state engaged in the recess 58, as shown in FIG. 1, is less than the height 65 of the clip 50 when the clip 50 is in the free, uncompressed state shown in FIG. 2. The compressed clip 50 thus slightly biases the head 40 away from the second component 14. Accordingly, after the sealant 16 cures, the biasing force of the clip 50 will assist in making the fastener 18 easily releasable by twisting the blade 44 in a direction to unthread the threaded portion 42 from the nut 30. Alternatively, the fastener 18 can be left in the attached, inserted position shown in FIG. 1 and used to provide additional mechanical restraint of the components 12, 14. Because the fastener 18 is a composite material, which is more compliant than a traditional metallic bolt and compression limiter, the fastener 18 will not tend to act as a fulcrum and magnify motion.

Figure 6:
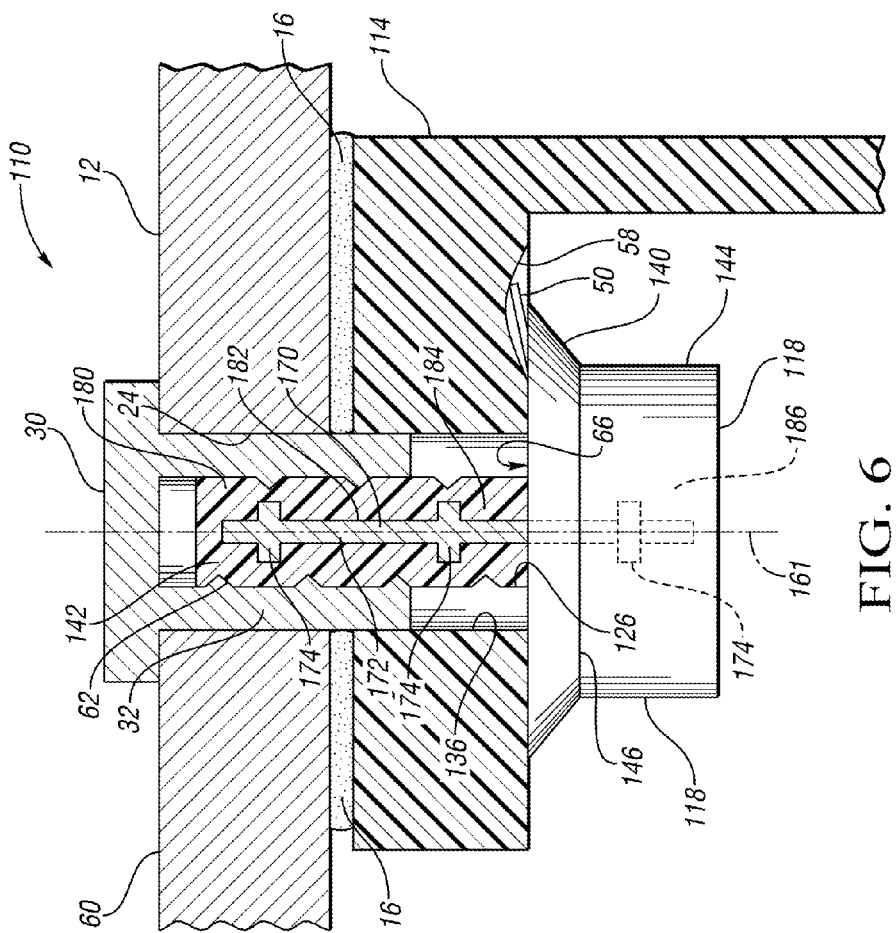
FIG. 6 is a partially cross-sectional and fragmentary schematic illustration of a second embodiment of an assembly including the composite engine component and the engine block of FIG. 1 attached via a second embodiment of a composite fastener with room temperature vulcanizing (RTV) sealant between the engine component and the engine block.

FIG. 6 shows an alternative embodiment of an assembly 110 that has many of the same components as the assembly 10 of FIGS. 1-4. The components of the assembly 110 that are the same as those of the assembly 10 are referred to with the same reference numbers, and are described with respect to the assembly 10. In the assembly 110, the second component 114 has a second opening 126 in which the prong receiving portions 136 extend completely through the second component 114 as shown in FIG. 6.

Furthermore, in the assembly 110, the fastener 18 is replaced with a fastener 118 that is alike in all aspects to the fastener 18 except that an elongated metallic member 170 is embedded into the fastener 118. The composite material of the fastener 118 is molded around the metallic member 170. The metallic member 170 has a center portion 172 positioned along a center axis 161 of the fastener 118. The center portion 172 extends into both a threaded portion 142 and through a base 146 into a head portion 140 of the fastener 118. A single turn blade 144 extends across the base 146. The metallic member 170 has serrations 174 extending outward from the center portion 172. Because composite materials can tend to creep, the metallic member 170 helps to limit or prevent creep of the fastener 118 by interrupting the continuity of the composite material. That is, the composite material of the fastener 118 is broken into segments 180, 182, 184, 186 by the serrations 174.

Figure 7:
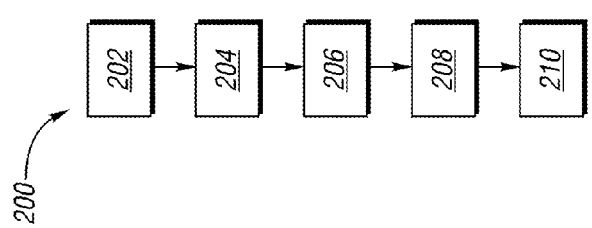
FIG. 7 is a flow diagram of a method of attaching a composite component to another component.
Figure 4:
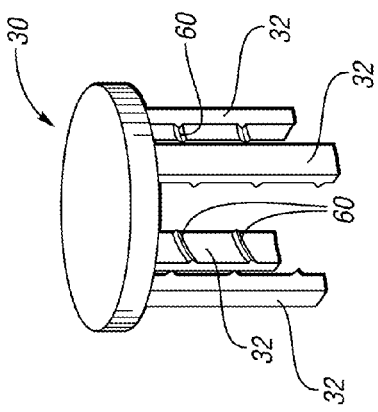
FIG. 4 is a schematic perspective illustration of a nut cap that receives the fastener.

Referring to FIG. 7, a method 200 of attaching the first component 12 to the second component 14 is shown as a flow diagram. The method 200 may be applied to a first component that is a metallic engine component, and a second component that is a composite engine component, but the application of the method 200 is not limited to these types of components.

The method 200 begins with step 202, in which the composite fastener 18 or 118 is injection molded. In the case of fastener 118, the step 202 includes a sub-step of inserting the metallic member 170 in the mold and molding the composite material around the metallic member 170 so that the metallic member 170 is embedded within the fastener 118.

After step 202, the method 200 proceeds to step 204 in which sealant, such as RTV sealant 16, is placed on the first component 12. Alternatively, the sealant 16 could be placed on the second component 14 or 114. Next, in optional step 206, threaded prongs 32 of a nut cap 30 are inserted into an opening 26 or 126 of the second component 14. Step 206 is optional because the fastener 18 or 118 could instead be inserted into a threaded opening directly in the first component 12 instead of a threaded nut cap placed in an unthreaded opening of the first component 12.

In step 208 of the method 200, the one-piece composite fastener 18 or 118 is turned into aligned openings, either 26 or 126 of the second component 14 or 114, respectively, and 24 of the first component 12 to engage internal threads 60 of either a cap portion 30 or a directly-threaded first component 12. The fastener 18 or 118 is turned until a clip portion 50 engages the first component 12 at a recess 58, at which point the head portion 40 or 140 is against the second component 14 or 114 and the sealant 16 is compressed by the tightened fastener 18, 118. Optionally, in step 210, the fastener 18 or 118 can be released and removed from the assembly 10, 110 by turning the fastener 18, 118 in an opposite direction than in step 208, causing the retention clip 50 to be released from the recess 58.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An assembly comprising:
   a first component;
   a second component;
   a sealant between the first component and the second component on one of a first surface of the first component and a first surface of the second component that faces the first surface of the first component;
   wherein the second component has a recess on a second surface of the second component opposite the first surface of the second component;
   a composite fastener that has a threaded portion and a head portion; wherein the head portion has a flange with slits and a retention clip formed between the slits; wherein the retention clip is on a side of the head portion that faces the second surface of the second component when the threaded portion is received in aligned openings of the first component and the second component so that the retention clip is received in the recess to thereby attach the second component to the first component and compress the sealant between the first component and the second component.

2. The assembly of claim 1, further comprising:
   an elongated metallic member embedded within the threaded portion.

3. The assembly of claim 2, wherein the elongated metallic member has a center portion that extends lengthwise along a center axis of the threaded portion; and wherein the elongated metallic member has at least one serration extending outward from the center portion.

4. The assembly of claim 1, wherein the head portion of the composite fastener has a single turn blade extending across the head portion.

5. The assembly of claim 1, wherein the threaded portion has a thread pitch configured relative to a length of the threaded portion such that the threaded portion is inserted into the first and the second components and the retention clip engages the second component at the recess.

6. The assembly of claim 1, wherein the aligned openings include a first opening of the first component and a second opening of the second component aligned with the first opening; wherein the threaded portion has an external thread, and further comprising:
   a nut cap that has spaced prongs that have an internal thread that matches the external thread of the threaded portion; and wherein the second opening is shaped so that the second component is configured to engage the prongs of the nut cap at the second opening.

7. The assembly of claim 1, wherein the composite fastener is a one-piece molded component.

8. An assembly comprising:
   a cast metallic engine block;
   a composite engine component;
   a room temperature sealant between the engine block and the engine component on a first surface of the engine block facing a first surface of the engine component;
   a nut cap with threaded prongs extending through a first opening in the engine block into a second opening in the engine component;
   wherein the engine component has a recess on a second surface of the engine component opposite the first surface of the engine component;
   a fastener that has a threaded portion and a head portion; wherein the head portion has a flange with slits and a retention clip formed between the slits; wherein the retention clip is on a side of the head portion that faces the second surface of the engine component when the threaded portion is received in the second opening of the engine component so that the retention clip is received in the recess.

9. The assembly of claim 8, wherein the fastener is a one-piece unitary component and further comprising:
   an elongated metallic member embedded within the threaded portion.

10. The assembly of claim 9, wherein the elongated metallic member has a center portion that extends lengthwise along a center axis of the threaded portion; and wherein the elongated metallic member has at least one serration extending outward from the center portion.

11. The assembly of claim 8, wherein the head portion of the fastener has a single turn blade extending across the head portion.

12. The assembly of claim 8, wherein the threaded portion has a thread pitch configured relative to a length of the threaded portion such that the threaded portion is inserted into the engine block and the engine component and the retention clip engages the engine component at the recess.

* * * * *